United States Patent [19]

Watanabe

[11] Patent Number: 5,205,589
[45] Date of Patent: Apr. 27, 1993

[54] AUTOMATIC SEAT BELT SYSTEM

[75] Inventor: Yasutaka Watanabe, Aichi, Japan

[73] Assignee: Kabushiki Kaisha Tokai-Rika-Denki-Seisakusho, Japan

[21] Appl. No.: 745,885

[22] Filed: Aug. 16, 1991

[30] Foreign Application Priority Data

Aug. 30, 1990 [JP] Japan .................... 2-229194

[51] Int. Cl.⁵ .................................... B60R 22/06
[52] U.S. Cl. ........................... 280/804; 280/808
[58] Field of Search ............ 280/801, 802, 804, 806, 280/808; 297/468, 469, 473, 479, 480

[56] References Cited

U.S. PATENT DOCUMENTS

| | | | |
|---|---|---|---|
| 4,573,709 | 3/1986 | Kawai et al. | 280/804 |
| 4,850,610 | 7/1989 | Asagiri et al. | 280/804 |
| 4,895,392 | 1/1990 | Schut et al. | 280/808 |
| 4,989,900 | 2/1991 | Steinhüser | 280/808 |

FOREIGN PATENT DOCUMENTS 2923305 12/1979 Fed. Rep. of Germany ...... 280/804

*Primary Examiner*—Margaret A. Focarino
*Assistant Examiner*—Paul Dickson
*Attorney, Agent, or Firm*—Sixbey, Friedman, Leedom & Ferguson

[57] ABSTRACT

Disclosed herein is an automatic seat belt system. A guide rail is mounted on a vehicle body, and a driving tape is disposed along the length of the guide rail. A drive means is energized to move a slider to either one of two positions where a webbing restrains an occupant or releases the occupant therefrom. One end of the webbing used for restraining the occupant is supported to the slider which is maintained in engagement with each of the openings defined in the tape. In addition, the slider is movable in the longitudinal direction of the guide rail, and disposed movably with respect to the guide rail. A stopper is maintained in engagement with the slider in the webbing-restraining position so as to prevent the slider from being moved in the direction to which the webbing is pulled. When the load in the upward direction of the vehicle is applied to the slider so as to move the slider upward, an engagement portion of the slider is brought into engagement with an end of the stopper in the lower direction of the vehicle so as to prevent the slider from being moved along the guide rail.

19 Claims, 6 Drawing Sheets

AUTOMATIC SEAT BELT SYSTEM

BACKGROUND OF THE INVENTION

1. Field of the Invention

The present invention relates to an automatic seat belt system, and particularly to an automatic seat belt system in which, by a simple operation, a webbing restrains an occupant or releases the occupant therefrom.

2. Description of the Related Art

A slider is provided in such a manner that it can be moved from a webbing-releasing position to a webbing-restraining position along a guide rail. One end of a webbing is supported with to the slider. In addition, the slider is coupled to a flexible tape as an elongated member or an electric motor through a wire. When the motor is energized, the slider moves along the guide rail. The tape manifests a lost motion piece, which is fixed to the motor side, extending from the slider to the motor, and which is used to place the webbing to either a webbing-restrained state or a webbing-released state.

There is disposed in the webbing-restraining position, a slider holding member, i.e., a shoulder anchor which is fixedly secured to a vehicle in order to hold the slider in the webbing-restraining position. The shoulder anchor has a pawl rockingly moved by the lost motion piece which is brought into contact therewith. The pawl is urged by a spring in the direction of a path along which the slider travels.

When the occupant sits in a vehicle seat and the door is closed, the motor is energized to displace the tape in the longitudinal direction of the guide rail. When the slider is moved in response to such a displacement so as to reach a location near the webbing-restraining position, the pawl is pressed by the lost motion piece so as to be expelled from the traveling path of the slider.

When the lost motion piece is further moved into the webbing-restraining position, the pawl is released from being pressed by the lost motion piece. Thus, the pawl is turned by the urging force of a spring so as to be held in engagement with the slider, thereby holding the slider by the slider holding member, i.e., providing the webbing-restrained state.

When it is desired to release the webbing from being restrained to the occupant, the motor is reversed so as to move the tape in the direction opposite to the direction referred to above. Thereafter, the pawl is pressed by the lost motion piece against the urging force of the spring, so that the pawl is released from engagement with the slider. Under this condition, the slider is caused to move toward the front of the vehicle, thereby releasing the webbing from the restrained occupant.

In the conventional system, a pawl is necessary for engaging the slider so as to hold the slider in the webbing-restraining position as described above.

Thus, when it is desired to move the slider from the webbing-restraining position to the webbing-releasing position, it is necessary to release the slider from being engaged with the pawl before the slider is moved. Therefore, the conventional system has the problem that the slider cannot be immediately moved when the webbing is released from the occupant.

When the slider is moved from the webbing-releasing position to the webbing-restraining position, it is necessary to expel the pawl from the traveling path of the slider by using the lost motion piece before the slider is moved so as to be brought into engagement with the pawl. Thus, the conventional system has the problem that the slider cannot be immediately engaged with the pawl upon restraining the occupant by the webbing.

SUMMARY OF THE INVENTION

With the foregoing problems in view, it is an object of the present invention to provide an automatic seat belt system capable of setting a webbing in two states: one in which a webbing restrains an occupant and another in which the occupant is released therefrom, both states being accomplished by a simple operation.

The present invention is suitable for use in an automatic seat belt system. In the system, a guide rail is mounted on a vehicle body, and an elongated member is disposed along the longitudinal direction of the guide rail. A drive means is energized to move a slider to either one of two positions where a webbing restrains an occupant or releases the occupant therefrom. One end of the webbing used to restrain the occupant is fixed to the slider. In addition, the slider is movable along the guide rail in the longitudinal direction, and is disposed movably with respect the guide rail. A stopper is maintained in engagement with the slider in the webbing-restraining position so as to prevent the slider from being moved in the direction of the acceleration of the vehicle. When the load is applied to the slider from the webbing in an upward direction of the vehicle so as to move the slider upward, the stopper is brought into engagement with the slider so as to prevent the slider from being moved upward along the guide rail.

According to the above described construction of the present invention, the slider is movable and can move along the length of the guide rail mounted on an interior wall of the vehicle. The slider has a mounting portion which engages the stopper when it is not moved to the webbing-restraining position, and an engagement portion which engages the stopper when the slider is moved to the webbing-restraining position. When the driving means is energized to move the elongated member in the longitudinal direction thereof and hence to move the slider into the webbing-restraining position, the mounting portion is brought into engagement with the stopper, thereby providing a webbing-restraint state. Specifically, the webbing-restraint state can be achieved by simply moving the slider to the webbing-restraining position. When the slider is moved to the webbing-restraining position, the engagement portion engages the stopper. Under this condition, the load applied to the slider is transmitted to the vehicle body through the stopper, thereby making it possible to prevent the slider from coming out of the guide rail. On the other hand, when the driving means is energized to move the elongated member in the opposite direction so as place the slider in the webbing-releasing position, a webbing-released state can be achieved. Specifically, the restraining of the occupant by the webbing can be released by simply moving the slider to the webbing-releasing position. Thus, the present invention can provide an automatic seat belt system capable of setting a webbing in two states by a simple operation, i.e., a webbing-restraint state and a webbing-released state.

According to the automatic seat belt system in the present invention, as has been described above, a pawl and a lost motion piece which have been employed in conventional arrangements or systems are unnecessary. In addition, either the webbing-restraint state and the webbing-released state can be selected by simply moving the slider along the guide rail.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 6:
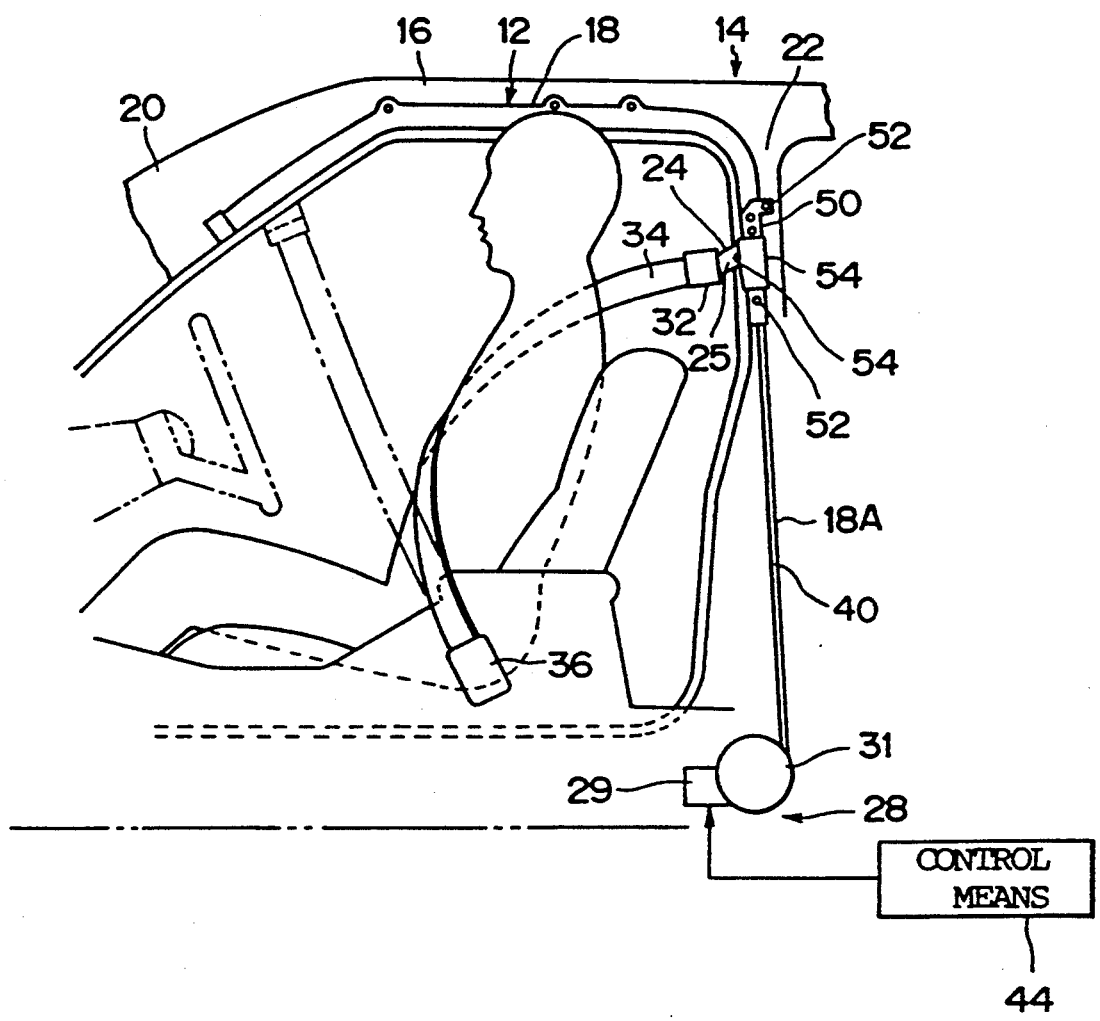
FIG. 6 is a view showing an overall structure of the automatic seat belt system of the present invention.

A preferred embodiment of the present invention will hereinafter be described in detail with reference to the accompanying drawings. FIG. 6 shows an automatic seat belt arrangement or system 12 according to the present embodiment.

A roof side portion 16 of a vehicle 14 has an intermediate portion of a guide rail 18, which extends in the longitudinal direction of the vehicle 14. The end of the guide rail 18 toward the front of the vehicle 14 extends along a front pillar 20 of the vehicle 14, whereas the other end thereof extending toward the rear of the vehicle 14 is curved substantially at a right angle and extends in the lower direction of the vehicle 14 along a center pillar 22.

Figure 3:
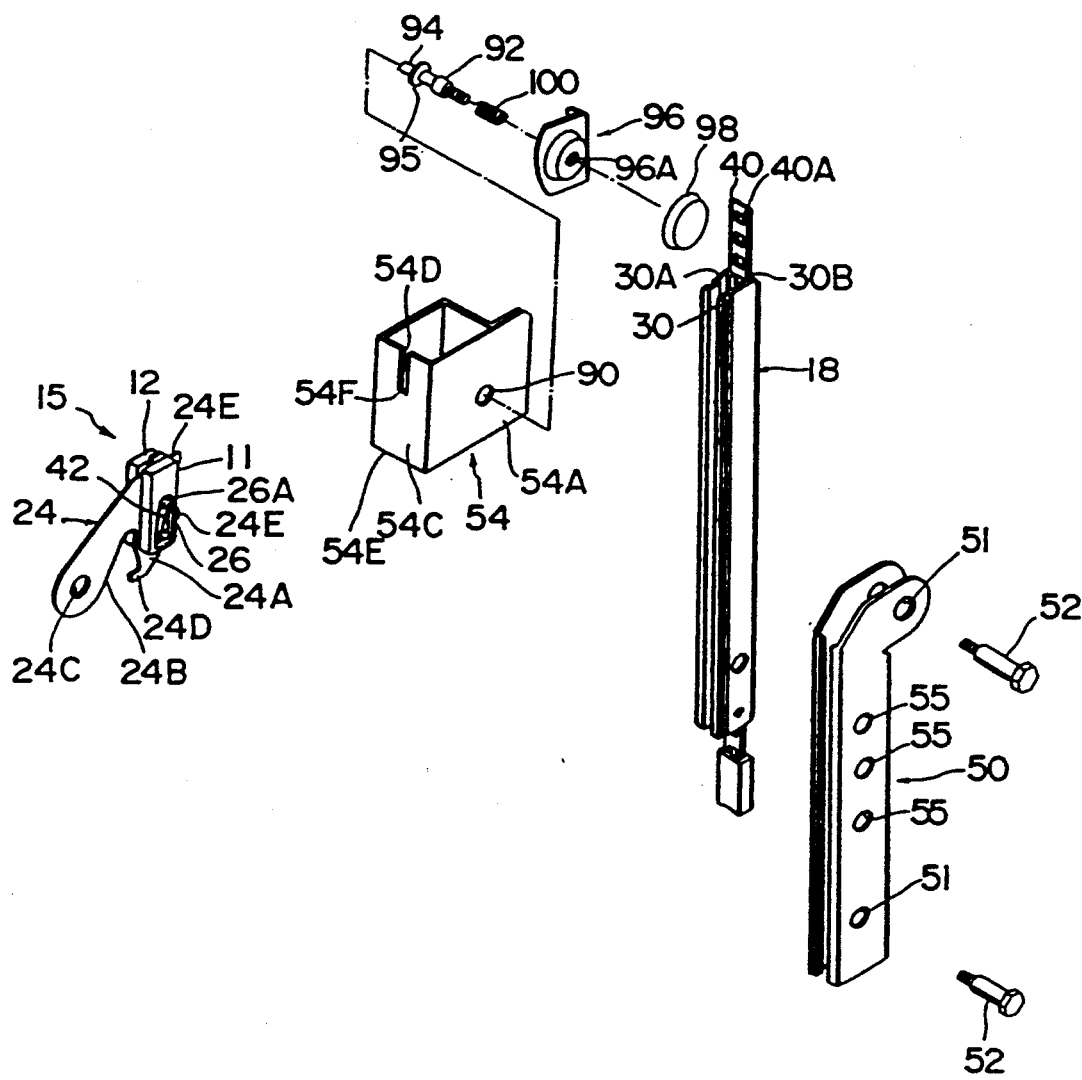
FIG. 3 is an exploded perspective view showing respective components of the automatic seat belt system according to the present invention.

As shown in FIG. 3, the guide rail 18 has a groove 30 defined therein along the length thereof. The groove 30 has opposed recess portions 30A defined in the side walls thereof. In addition, the groove 30 has a tape receiving groove 30B for receiving a driving tape 40 therein, which is defined in the bottom thereof along the longitudinal direction of the guide rail 18.

Figure 1:
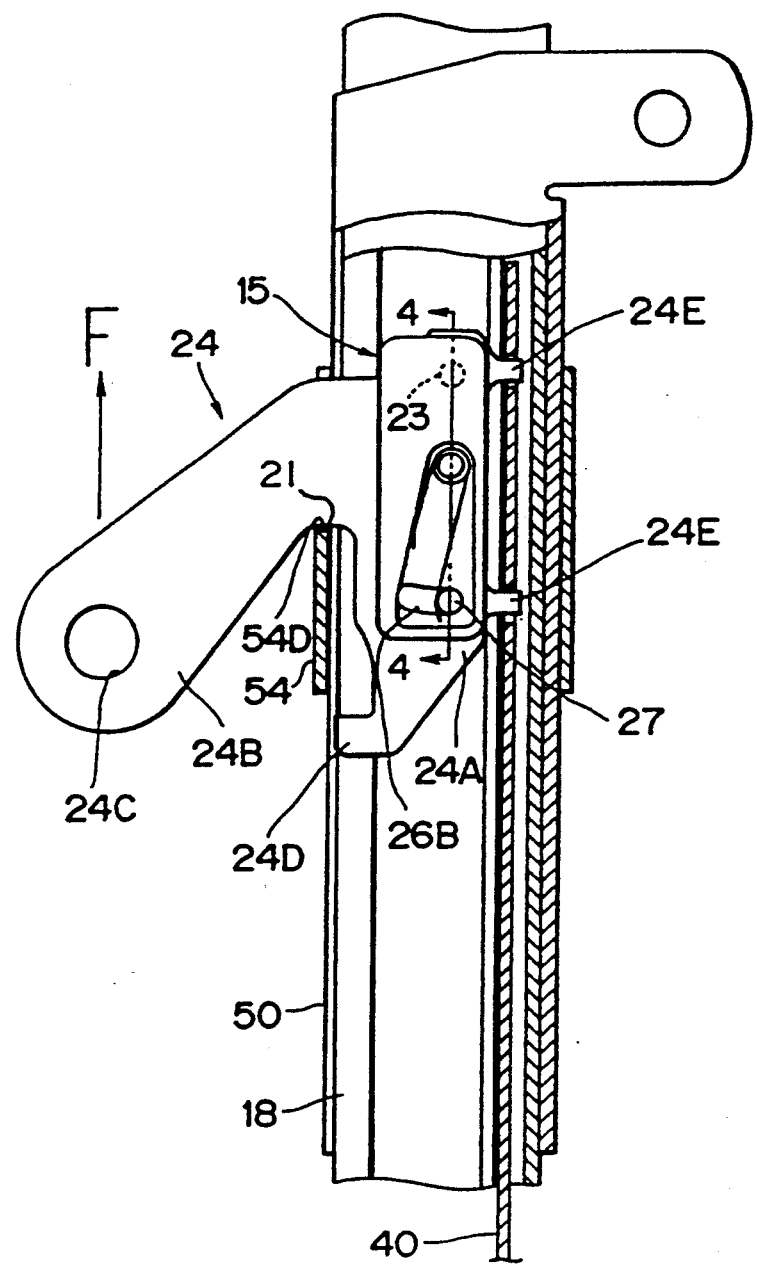
FIGS. 1 and 2 are views for describing the operation of an automatic seat belt system according to one embodiment of the present invention.
Figure 2:
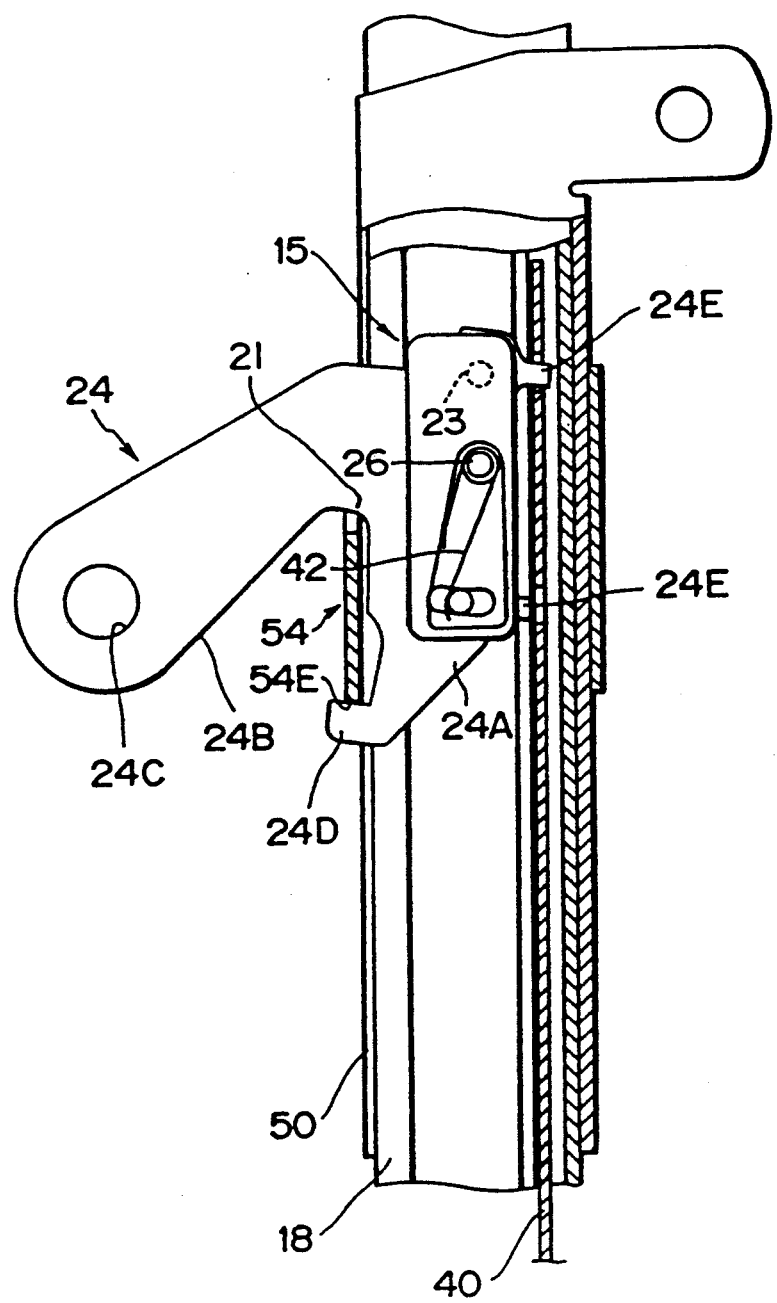

As shown in FIGS. 1 through 3, a slider 24, which forms a part of a sliding member, has a base 24A disposed along the guide rail 18. The base 24A is formed with an attachment, i.e., a mounting portion 24B which extends from one end of the base 24A to the direction in which the groove 30 is opened, i.e., in the lefthand direction as seen in FIGS. 1 and 2. The mounting portion 24B has a first engagement portion 21 formed in an end thereof on the base 24A side. The base 24A is formed with a second engagement portion 24D projecting toward the mounting portion 24B from the other end thereof. Further, the slider 24 is provided with a pair of engagement projections 24E projecting toward the bottom of the groove 30, i.e., in the right-hand direction as seen in FIGS. 1 and 2.

The mounting portion 24B has a mounting hole 24C defined in the leading end thereof. A mounting member is inserted into the mounting hole 24C so as to mount a connecting member 32 such as a buckle on the mounting portion 24B of the slider 24. One end of a webbing 34 is fixedly secured to the connecting member 32 (see FIG. 6). Incidentally, the other end of the webbing 34 is wound on a webbing retractor 36 in coil form, the retractor 36 being disposed in the center of the vehicle 14, and accommodated therein.

A pin 23, which extends through the base 24A in the direction of the thickness thereof and whose both ends projects outward from the base 24A, is secured at a position near the upper end portion of the base 24A. In addition, a pin 27, which extends through the base 24A in the direction of thickness thereof, is fixed to a position near the lower end portion of the base 24A.

Figure 4:
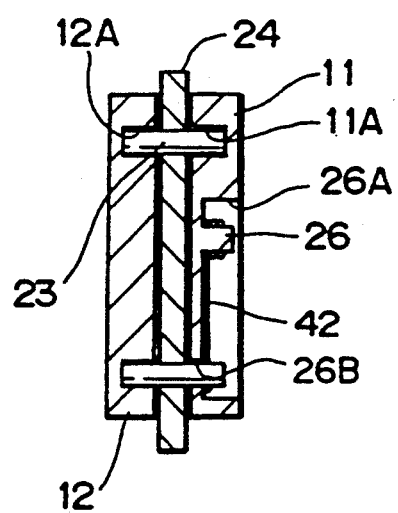
FIG. 4 is a cross-sectional view taken along line 4—4 of FIG. 1.

As shown in FIGS. 3 and 4, a slider base 15, which constitutes the sliding member together with the slider 24, is comprised of a pair of plate-shaped members 11, 12. The plate-shaped members 11, 12 respectively have recesses 11A, 12A defined in upper portions thereof as seen in FIG. 1, i.e., in the upper direction of the vehicle 14. A recess 26A is defined in a lower portion of the plate-shaped member 11, i.e., in the lower direction of the vehicle 14. The recess 26A has an elongated slot 26B defined in the bottom thereof in the lower direction of the vehicle 14. A pin 26 disposed in the upper direction of the vehicle 14 and located upwardly of the elongated slot 26B is mounted at the bottom of the recess 26A. Both ends of the pin 23 penetrating the slider 24 are inserted into the recesses 11A, 12A of the plate-shaped members 11, 12, respectively. The pin 27 of the slider 24 is inserted into the elongated slot 26B in a state in which it projects from the bottom of the recess 26A. Thus, the slider 24 is supported by the slider base 15 with the slider 24 interposed between the plate-shaped members 11, 12 in such a manner that it can be rotatably moved together with the pin 23 about the same. The slider base 15 which rotatably supports the slider 24 thereon is inserted into the groove 30 and held therein.

A spring 42 is interposed between the pins 26 and 27. The slider 24 is urged by the urging force of the spring 42 counterclockwise as viewed in FIGS. 1 and 2, i.e., in a direction in which the tape 40 is positioned.

The tape 40 is accommodated in the tape receiving groove 30B. The tape 40 has a plurality of openings 40 at predetermined intervals along the longitudinal direction thereof. The dimension of each of the openings 40A is designed so as to prevent the engagement projections 24E from being displaced in the longitudinal direction of the tape 40. The engagement projections 24E are inserted into the respectively corresponding openings 40A. Thus, when the tape 40 is moved, the slider 24 is also displaced together with the tape 40. The dimension of each of the openings 40A is designed so as to define a slight clearance in the longitudinal direction of the tape 40 in such a manner that the slider 24 can be rotatably moved in a state in which the engagement projections 24E are being inserted into the corresponding openings 40A.

The guide rail 18 has a reinforcement 50 disposed on the lower periphery thereof. The reinforcement 50 is shaped in the form of a curved casing and is made from a steel plate. The reinforcement 50 is used to cover and reinforce the guide rail 18. The reinforcement 50 has circular holes 51 defined in a curved upper portion and a lower end portion thereof. The reinforcement 50 and one end of the guide rail 18 are secured to the main body of the vehicle 14 by bolts 52 which are inserted into the circular holes 51 (see FIG. 6). Incidentally, the circular hole 51 defined in the lower portion of the reinforcement 50 is in a position where the movement of the tape 40 is not stopped by the corresponding bolt 52.

A stopper 54 is mounted on the outer peripheral wall of the reinforcement 50. The stopper 54 is fixed to the reinforcement 50 by an unillustrated bolt. Specifically, the stopper 54 is secured to the body of the vehicle 14 via the reinforcement 50. As shown in FIG. 3, the stopper 54 is made of a bent steel plate and as a whole shaped substantially in the form of a casing. In addition, the stopper 54 has a side wall 54C disposed in the frontal direction of the vehicle 14 and a side wall 54A with a circular hole 90 defined therein. The side wall 54C has a rectangular groove 54D opened toward the upward direction of the vehicle 14. The slider 24 is positioned such that the first engagement portion 21 engages the bottom 54F of the groove 54D when the webbing is restraining an occupant. When the slider 24 is angularly moved clockwise as seen in FIG. 1 in a state in which the base 24A is inserted into the stopper 54, the slider 24 is held by the stopper 54 in such a way that the second engagement portion 24D engages an end 54E of the side wall 54C toward the lower part of the vehicle 14.

The circular hole 90 can be aligned with each of a plurality of circular holes 55 in the reinforcement 50 when the stopper 54 is slid in the upward and downward directions. A lock pin 92 is supported by a tension holder 96.

The lock pin 92 has a leading end 94 which is first inserted into the circular hole 90 and then into a corresponding circular hole 55. As a consequence, the stopper 54 is coupled to the reinforcement 50 and supported thereto. A disc-shaped flange portion 95 is formed toward the leading end 94 of the lock pin 92 so as to project in a radial direction of the lock pin 92. An end portion of an intermediate portion of the lock pin 92 extends through a through hole 96A of the tension holder 96 and is threadedly engaged to a knob 98. A compression coil spring 100 is interposed between the tension holder 96 and the flange portion 95. Hence the lock pin 92 is urged in the transverse direction of the vehicle 14 at all times.

When the stopper 54 is moved up and down, a desired circular hole 55 is aligned with the circular hole 90 thereby releasing the knob 98 from the state of being pulled. As a consequence, the leading end 94 slips into the circular hole 55. Hence the position for coupling the stopper 54 to the reinforcement 50 can be changed as needed.

As shown in FIG. 6, an end of the tape 40 in the lower direction of the vehicle 14, which extends out from one end of the guide rail 18, is guided along an auxiliary guide 18A which extends from the guide rail 18 and is connected to a drive unit 28 serving as a drive source. The drive unit 28 comprises an electric motor 29 and a gear 31. As illustrated in FIG. 6, a control means 44 is electrically connected to the motor 29. The control means 44 is activated to drive and stop the motor 29.

Figure 5:
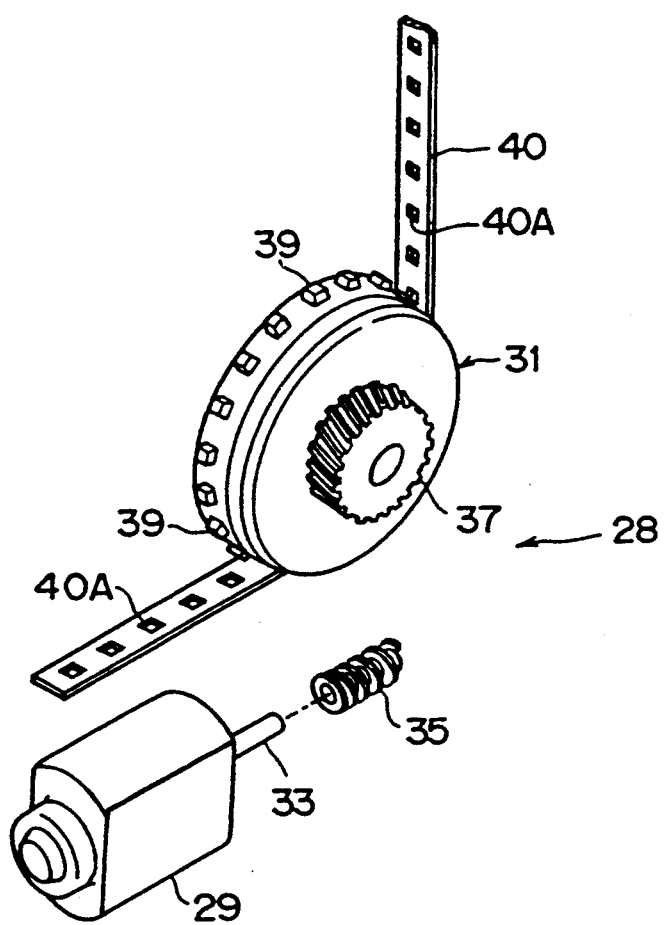
FIG. 5 is an exploded perspective view of a drive unit.

As depicted in FIG. 5, a worm gear 35 is fixedly secured onto a rotatable shaft 33 of the motor 29. Gear 31 has a worm wheel 37 formed on one side wall thereof and is in meshing engagement with the worm gear 35. In addition, the gear 31 has an outer peripheral wall on which a plurality of racks 39 are formed so as to engage the openings 40A of the tape 40. Therefore, when the motor 29 is energized, the turning force of the motor 29 is transmitted to the tape 40 through the worm gear 35 and the worm wheel 37.

The operation of the present embodiment will now be described below.

When the automatic seat belt system is in a nonactivated state before the occupant sits in the seat, the slider 24 is positioned at the end of the guide rail 18 which is at the front of the vehicle 14. In addition, the motor 29 of the drive unit 28 is deenergized. The occupant can sit in the seat because a wide space is defined between the webbing 34 and the seat.

When the occupant sits on his seat, an unillustrated sensor is activated to detect whether or not he sits on his seat. Thus, the control means 44 is activate to rotate the motor 29 of the drive unit 28. When the motor 29 is rotated, the turning force of the motor 29 is transmitted to the tape 40 through the worm gear 35, the worm wheel 37 and the racks 39, so that tensile force is applied to the tape 40. Thereby, the slider 24 is moved along the guide rail 18. When the slider 24 is moved to a predetermined position, i.e., a position where the first engagement portion 21 engages the bottom 54F of the groove 54D, an unillustrated sensor is activated to detect such engagement, so that the motor 29 is de-energized by the control means 44. As a consequence, the webbing restrains the occupant, i.e., the state shown in FIG. 1. When load in the direction in which the first engagement portion 21 engages the bottom 54F thereof is applied to the slider 24 under this condition, the applied load is transmitted to the body of the vehicle 14 by the stopper 54.

In the present embodiment, the slider 24 can be immediately displaced when it is moved to a webbing-restraining position. Therefore, the webbing can be changed from a webbing-released state to a webbing-restrained state by a simple operation. In the present embodiment, as well, the webbing restrains the occupant without bringing a pawl described in a conventional example into engagement with the slider 24 via the urging force of a spring, thereby producing no sound offensive to the ear at the time that the webbing is fastened around the occupant. It is also unnecessary to provide a pawl and a lost motion piece which was described in a conventional example. Hence the number of components employed in the automatic seat belt system can be reduced.

If, during an emergency, for example, the tensile force is in direction F, i.e., in an upward direction as seen in FIG. 1 this force acts on the slider 24. The slider 24 is turned clockwise as seen in FIG. 1 about the pin 23 against the urging force of a spring 41. Thus, the second engagement portion 24D is engaged with the end 54E of the stopper 54 as shown in FIG. 2. When a load in the direction of F is applied to the slider 24 under this condition, the load is transmitted to the body of the vehicle 14 via the stopper 54. As a consequence, the slider 24 is prevented from being released from the stopper 54. On the other hand, when the vehicle is no longer in a rapid decelerated state, the slider 24 is moved to the position shown in FIG. 1 by the urging force of the spring 41.

When the webbing is released from restraining the occupant, the unillustrated sensor is activated to detect the release, so that the motor 29 is reversed by the control means 44. The turning force produced by the motor 29 is transmitted to the tape 40 via the worm gear 35, the worm wheel 37 and the racks 39, so that a compressive force acts on the tape 40. Thereby, the slider 24 is moved toward the front of the vehicle 14 along the guide rail 18.

When the slider 24 reaches the end of the guide rail 18 in the frontal direction of the vehicle 14, the control means 44 is activated to stop the motor 29. As a consequence, a wide spacing is defined between the webbing and the vehicle seat, so that the occupant can leave his seat.

As described above, the present embodiment shows and describes an automatic seat belt system having a webbing-restraining height adjustment mechanism. However, the present embodiment can also be applied to an arrangement free of such a webbing-restraining height adjustment mechanism.

Having now fully described the invention, it will be apparent to those skilled in the art that many changes and modifications can be made without departing from the spirit or scope of the invention as set forth herein.

What is claimed is:

1. An automatic seat belt system comprising:
   a guide rail mounted on a vehicle body;
   a slider to which one end of a webbing for restraining an occupant is supported, said slider being movable longitudinally along said guide rail and disposed in such a manner so as to be swingable with respect to said guide rail;
   an elongated member on which said slider is mounted, said elongated member being movable reciprocatively along the length of said guide rail;
   driving means for moving said elongated member longitudinally along said guide rail so as to dispose said slider in either one of two positions where said webbing restrains the occupant and releases the occupant therefrom; and
   a stopper engaged with said slider in the webbing-restraining position so as to prevent said slider from being moved in the direction to which the webbing is pulled, said stopper being brought into engagement with said slider when a load in an upward direction is applied to said slider so that said slider is swingingly moved upward, thereby preventing said slider from being moved upward along said guide rail wherein said slider includes a pair of slider members capable of sliding along said guide rail and wherein said slider is swingable with respect to said slider members.

2. An automatic seat belt system according to claim 1, wherein said slider members have a pin member, said slider being supported so as to be swingable with respect to said slider members.

3. An automatic seat belt system according to claim 2, wherein said pin member is disposed in an upward position with respect to an engagement portion of said slider held in engagement with said stopper when the load is applied in an upward direction to said slider at the time said slider is in the webbing-restraining position.

4. An automatic seat belt system according to claim 3, wherein said slider has a mounting portion to which said one end of the webbing is fixed, said mounting portion being disposed above said stopper when said slider is in the webbing-restraining position, said slider having said engagement portion engaged with said stopper when the load is applied in an upward direction to said slider, said engagement portion being disposed at the end of said stopper.

5. An automatic seat belt system according to claim 1, wherein said slider has a plurality of engagement projections projecting from an end face of said slider facing said elongated member, said engagement projections being respectively engaged with said elongated member, and wherein at least one of said engagement projections is released from being engaged with said elongated member when said slider is swingingly moved upon application of the load applied in an upward direction with respect to said slider.

6. An automatic seat belt system according to claim 1, wherein said stopper has an engagement portion to which said slider engages upon application of the load in an upward direction of the vehicle to said slider, said engagement portion being provided to transmit said load applied to said slider to the vehicle body.

7. An automatic seat belt system comprising:
   a guide rail mounted on a region extending from a front pillar to a center pillar of a vehicle body;
   a slider to which one end of a webbing for restraining an occupant is supported, said slider having slider members, said slider being movable longitudinally along guide rail via said slider members and disposed in a manner so as to be swingably movable with respect to said guide rail and said slider members;
   a driving tape on which said slider is mounted, said tape being movable reciprocatively along said guide rail;
   driving means for moving said tape along the longitudinal direction of said guide rail so as to dispose said slider in either one of two positions where said webbing restrains an occupant or releases the occupant therefrom; and
   a stopper engaged with said slider in the webbing-restraining position so as to prevent said slider from being moved in the direction to which the webbing is pulled, said stopper being brought into engagement with said slider when a load is applied in an upward direction to said slider so that said slider is swingingly moved upward, thereby preventing said slider from being moved upward along said guide rail.

8. An automatic seat belt system according to claim 7, wherein said stopper has an engagement portion with which said slider is engaged by swingably moving said slider, said engagement portion being provided to transmit said load applied to said slider to the vehicle body.

9. An automatic seat belt system according to claim 7, wherein said slider members have urging means for urging said slider in a direction to prevent the swinging movement of said slider.

10. An automatic seat belt system according to claim 7, wherein said slider has a plurality of engagement projections projecting from an end face of said slider facing said tape, said engaging projections being respectively engaged with said tape, and wherein at least one of said engagement projections is released from being engaged with said tape when said slider is swingably moved upon application of a load in the upward direction of the vehicle to said slider.

11. An automatic seat belt system according to claim 7, wherein said slider bases have a pin member which is engaged with said stopper when the load is an upward direction is applied to said slider at the time said slider is in the webbing-restraining position, said slider being supported so as to be swingable with respect to said slider members.

12. An automatic seat belt system according to claim 11, wherein said slider has a mounting portion to which said one end of said webbing is fixed, said mounting portion being disposed above said stopper when said slider is in the webbing-restraining position, said slider having said engagement portion engaged with said stopper when the load is applied in an upward direction to said slider, said engagement portion being disposed at an end of said stopper in the lower direction of the vehicle.

13. An automatic seat belt system comprising:
a guide rail mounted on a vehicle body;
a slider to which one end of a webbing for restraining an occupant is supported, said slider being movable longitudinally along guide rail via and disposed in a manner so as to be swingable with respect to said guide rail;
an elongated member on which said slider is mounted, said elongated member being movable reciprocatively along the length of said guide rail;
driving means for moving said elongated member longitudinally along the guide rail so as to dispose said slider in either one of two positions where said webbing restrains an occupant and releases the occupant therefrom; and
a stopper engaged with said slider in the webbing-restraining position so as to prevent said slider from being moved in the direction to which the webbing is pulled, said stopper being brought into engagement with said slider when a load is applied in an upward direction to said slider so that said slider is swingingly moved upward, thereby preventing said slider from being moved upward along said guide rail wherein said slide includes a pair of slider members capable of sliding along said guide rail, wherein said slider is swingable with respect to said slider members and wherein said slider members include urging means for urging said slider in such a direction as to prevent said slider being swingably moved.

14. An automatic seat belt system comprising:
a guide rail mounted on a region extending from a front pillar to a center pillar of a vehicle body;
a slider made of a plate member to which one end of a webbing for restraining an occupant is supported;
slider members disposed on both side faces of said slider, said slider members supporting said slider thereon wherein said slider members are movable along said guide rail and wherein said slider is swingable with respect to said slider members;
a driving tape on which said slider is mounted, said tape being movable reciprocatively along said guide rail;
driving means for moving said tape longitudinally along said guide rail so as to dispose said slider in either one of two positions where said webbing restrains the occupant or releases the occupant therefrom;
a stopper engaged with said slider in the webbing-restraining position so as to prevent said slider from being moved in a direction to which the webbing is pulled, said stopper being brought into engagement with said slider when said slider is subjected to a load, thereby preventing said slider from being moved along said guide rail; and
a stopper holding member for holding said stopper in position.

15. An automatic seat belt system according to claim 14, wherein said slider has a mounting portion to which said one end of the webbing is fixed, said mounting portion being disposed above said stopper when said slider is in the webbing-restraining position, said slider having an engagement portion engaged with said stopper when a load in an upward direction is applied to said slider, said engagement portion being disposed at the end of said stopper.

16. An automatic seat belt system according to claim 14, wherein said slider members have urging means for urging said slider in a direction so as to release said slider from engagement with said stopper when the load in the upward direction is applied to said slider.

17. An automatic seat belt system according to claim 14, wherein said slider has a plurality of engagement projections projecting from an end face of said slider facing said tape, said engagement projections being respectively engaged with said tape, at least one of said engagement projections being released from being engaged with said tape when said slider is swingably moved upon application of the load in the upward direction to said slider.

18. An automatic seat belt system according to claim 14, wherein said stopper holding member has a lock pin which extends through said stopper, thereby holding said stopper in position.

19. An automatic seat belt system according to claim 14, wherein said stopper has an engagement portion at which said slider is engaged when the load in the upward direction is applied to said slider, said engagement portion being provided to transmit said load applied to said slider to the vehicle body.

* * * * *